United States Patent [19]
Jirnov et al.

[11] Patent Number: 5,758,501
[45] Date of Patent: Jun. 2, 1998

[54] SLIDING-BLADE VAPOR ENGINE WITH VORTEX BOILER

[76] Inventors: Olga Jirnov; Alexei Jirnov, both of 5490 Braesvalley, Apt. No. 420, Houston, Tex. 77096

[21] Appl. No.: 582,122

[22] Filed: Jan. 2, 1996

Related U.S. Application Data

[63] Continuation-in-part of Ser. No. 400,764, Mar. 8, 1995, Pat. No. 5,511,525.

[51] Int. Cl.$^6$ ............................................. F01K 7/00
[52] U.S. Cl. ........................... 60/670; 418/150; 418/255
[58] Field of Search ........................... 60/670; 418/150, 418/255

[56] References Cited

U.S. PATENT DOCUMENTS

| | | | |
|---|---|---|---|
| 133,318 | 11/1872 | Jessop | 418/255 |
| 371,212 | 10/1887 | Pearson | 60/670 |
| 4,385,873 | 5/1983 | Richter | 418/255 |
| 5,144,802 | 9/1992 | Ruzic | 418/255 |

FOREIGN PATENT DOCUMENTS

| | | | |
|---|---|---|---|
| 531659 | 10/1921 | France | 418/255 |
| 251816 | 10/1912 | Germany | 418/255 |
| 57-83690 | 5/1982 | Japan | 418/255 |
| 396013 | 7/1933 | United Kingdom | 418/255 |

*Primary Examiner*—Michael Koczo
*Attorney, Agent, or Firm*—Kenneth A. Roddy

[57] ABSTRACT

A sliding-blade vapor engine has a vortex boiler, condenser, blower and oval-shaped expander and pump chambers with cylindrical expander and pump rotors rotatably mounted eccentrically therein. Each rotor has at least two rectangular blades slidably mounted in slots extending through the cylindrical rotor in mutually perpendicular relation and each blade is independently movable relative to the other in a radial direction. Each blade has a guide element extending from opposed sides and through the opposed end walls of the respective rotor which are slidably received in guide grooves in the respective chamber end walls. The rotors are connected together by shafts in concentric relation whereby rotation of the expander rotor causes simultaneous rotation of the pump rotor and the guide elements traveling in the guide grooves cause the blades to extend and retract radially with their outer ends following the inner periphery of the respective chamber side wall with a constant minimum clearance. The expander rotor is rotated by a working medium from the vortex boiler which causes rotation of the pump rotor. Rotation of the pump rotor draws liquid from a condenser into the pump chamber, compresses it, and discharges it. The discharged liquid enters the vortex boiler, is heated, evaporated, enters the expander chamber, and is discharged back into the condenser. The sliding-blade expander may also be powered by all qualities of geothermal fluids and operate as a motor to drive an electric generator.

17 Claims, 8 Drawing Sheets

SLIDING-BLADE VAPOR ENGINE WITH VORTEX BOILER

CROSS REFERENCE TO RELATED APPLICATION

This application is a continuation-in-part of U.S. patent application Ser. No. 08/400,764, filed Mar. 8, 1995, now U.S. Pat. No. 5,511,525.

BACKGROUND OF THE INVENTION

1. Field of the Invention

This invention relates generally to vapor engines, and more particularly to a sliding-blade vapor engine with a vortex boiler for use as a power plant and as an expander for geothermal power plants.

2. Brief Description of the Prior Art

A preferred embodiment of the present invention includes a sliding-blade expander, a sliding-blade pump, and a vortex steam generator or boiler. Vane pumps and heat engines are known in the art for performing various functions in which vane radial travel is accomplished by the interaction between vane tips with the internal body bore. Commonly, in vane heat engines the work of expansion or compression is carried out in an oval-shaped working chamber formed by static surfaces in the engine body and the outer surface of a cylindrical rotor eccentrically positioned in the cavity. In most vane type heat engines, the forces arising from gas expansion or compression are absorbed by vanes which are positioned in rotor slots and reciprocate radially when the rotor rotates.

Ruzic, U.S. Pat. No. 5,144,802 discloses a rotary fluid apparatus having pairs of connected vanes; Allen, U.S. Pat. No. 5,336,059 discloses a vane-type rotary heat driven compressor; Boehling, U.S. Pat. No. 5,325,671 discloses a vane-type rotary heat engine; and Christopher et al, U.S. Pat. No. 4,037,415 discloses a vane-type implosion rotary engine.

The principal disadvantage of such engines is that the vane reciprocating movement is done by force resulting from reacting the vane tips against the solid fixed surface of the engine body. As the engine operates, the vane tips (even if equipped with special points) are subjected to intensive abrasive wear-out as a result of unlubricated friction, especially at high gas temperatures and gas contamination.

Moreover, the inlet and outlet ports in such engine designs cannot be made the full width of the operating chambers nor made tangentially in the direction of rotor rotation, but rather at an angle to the rotor rotation plane in the walls of the operating chamber. This causes additional hydrodynamic losses while throttling, and decreases the efficient filling of the operating chamber of the turbine and compressor.

Vane pumps and engines are also known in the art wherein the vanes are prevented from contacting the internal bore of the body. Hiroshi et al, U.S. Pat. No. 5,044,910 discloses a vane pump with rotatable drive means for the vanes wherein the vanes are prevented from contacting the internal bore of the body. Chu, U.S. Pat. No. 5,316,456 discloses a vane-type rotary compressor. Eckharolt, U.S. Pat. No. 5,316,456 discloses a slide vane machine.

In these pumps and engines, the vane movement control means are positioned in the operating chambers and are not protected from interaction with the working medium. Another disadvantage is that these designs have short vanes which are extended maximally in rotor slots and are subjected to large bending loads that subject the slot area to distortion and resultant increased resistance as they slide in the slots. If the expander is a high-speed turbine, wet vapor produces destructive erosion of the blades.

The expander and pump of the present sliding-blade vapor engine does not have the above described deficiencies. The sliding-blade vapor engine in accordance with the present invention may be used as a geothermal direct steam cycle power plant wherein the expander of the engine is capable of operating with steam that is far from pure, wet steam with a large degree of moisture, or a mixture of gas and steam. The expander can operate as a hydromotor and as a flash steam engine on steam-water mixture without initial steam withdrawal and can utilize geothermal fluids of all qualities including geothermal brine as the working medium. This feature not only simplifies the whole geothermal power plant because there is no need for special units, such as flash boilers, separators, etc., but also significantly increases geothermal heat to the degree of electric power conversion.

An oscillating vane engine known as the KROV (Keller Rotor Oscillating Vane), which operates on geothermal fluids of all qualities, is described in a book written by H. Christopher and H. Armstead titled "Geothermal Energy", 2nd ed., pp. 200–210, 1983.

Although the Keller Rotor Oscillating Vane engine (KROV) should be capable of handling a wide range of fluid conditions over high expansion ratios it is mechanically very complex and its efficiency is unlikely to be high. Also, the sealing between inlet and exhaust, which is dependent upon contact between the roller-pistons and vanes, is likely to be unsound.

The ability of the expander of the present engine, unlike a turbine, operates on wet steam at high degree of moistness and increases expansion ratio in the expander, which leads to increased steam-cycle thermal efficiency. The expander slow speed also beneficially differs from the turbine because it allows direct drive for a generator without requiring gear reduction. Its ability to operate on different working mediums also allows it to be used advantageously in binary or refrigeration cycles.

The design of the vapor generator of the present sliding-blade vapor engine, its thermal effectiveness, overall dimensions, and weight is appreciably better than known designs. This is achieved by employing vortical streams with multiple recirculation loops in a process of fluid vaporization and superheating the vapor. In the process, separation of two-phase working medium (liquid-vapor) occurs by centrifugal force, which maintains contact of only the liquid phase with the heat transferring boiler wall in the process of its vaporization that results in increased rate of heat transfer without the crisis of boiling.

In an article written by Z. Guo and V. K. Dhir titled "Effects of Injection Induced Swirl Flow on Single and Two-Phase Heat Transfer" (ASME HTDF Vol. 81, pp 77–84, 1987), Guo and Dhir tested tangential injection of fluid into a boiler. They investigated single and two-phase heat transfer in tangential injection induced swirl flow. They observed that local heat transfer (Nusselt number, Nu) was increased up to 700% when all of the fluid was injected tangentially. They investigated heat transfer in a linear tube where swirl flow was generated by a vortex chamber positioned at its inlet. This design is not optimal, because the swirl flow attenuates and is not maintained the entire length of the heat transfer surface.

Yet, to the present day, there is no known vapor generator design which effectively utilises this effective heat exchange method. The vapor generator of the present sliding-blade engine fulfills this need and ovecomes the above described problems by providing a vortex chamber positioned at the tube inlet and ejectors with feedback loops positioned along the length of the heat transfer section. This enables the results to be increased by inducing swirl flow and intensive recirculation of fluid and vapor all along the length of the heat transfer section.

The present sliding-blade vapor engine with vortex boiler can be made for industrial or home use as a compact electric power plant, capable of operating on all kinds of gaseous, liquid, and solid fuels, including agriculture and other combustable waste. The expander of the present sliding-blade vapor engine may also be used as a motor to drive a generator in transport vehicles and atomic power plants.

SUMMARY OF THE INVENTION

It is therefore an object of the present invention to provide a sliding-blade vapor engine with a vortex boiler which is small and can generate a large amount of power.

It is another object of this invention to provide a sliding-blade vapor engine with a vortex boiler which will reduce environmentally damaging emissions.

Another object of this invention is to provide a sliding-blade vapor engine with a vortex boiler which may employ a variety of types of combustible fuels, including agricultural and other combustible waste.

Another object of this invention is to provide a sliding-blade vapor engine with a vortex boiler which is inexpensive to manufacture in mass production and is inexpensive to operate, service, and repair.

A further object of this invention is to provide a sliding-blade vapor engine with a vortex boiler in which steam generation enables the resultant power to be increased corresponding to the rate of heat.

A still further object of this invention is to provide a sliding-blade vapor engine with a vortex boiler and an expander component capable of operating on geothermal brine in a direct steam cycle power plant, as a hydro-motor, and as a flash steam engine utilizing a steam-water mixture without initial steam withdrawal.

Other objects of the invention will become apparent from time to time throughout the specification and claims as hereinafter related.

The above noted objects and other objects of the invention are accomplished by a sliding-blade vapor engine having a vortex boiler, condenser, blower and oval-shaped expander and pump chambers with cylindrical expander and pump rotors rotatably mounted eccentrically therein. Each rotor has at least two rectangular blades slidably mounted in slots extending through the cylindrical rotor in mutually perpendicular relation and each blade is independently movable relative to the other in a radial direction. Each blade has a guide element extending from opposed sides and through the opposed end walls of the respective rotor which are slidably received in guide grooves in the respective chamber end walls. The rotors are connected together by shafts in concentric relation whereby rotation of the expander rotor causes simultaneous rotation of the pump rotor and the guide elements traveling in the guide grooves cause the blades to extend and retract radially with their outer ends following the inner periphery of the respective chamber side wall with a constant minimum clearance. The expander rotor is rotated by a working medium from the vortex boiler which causes rotation of the pump rotor. Rotation of the pump rotor draws liquid from a condenser into the pump chamber, compresses it, and discharges it. The discharged liquid enters the vortex boiler, is heated, evaporated, enters the expander chamber, and is discharged back into the condenser. The sliding-blade expander may also be powered by all qualities of geothermal fluids and operate as a motor to drive an electric generator.

DESCRIPTION OF THE PREFERRED EMBODIMENT

Figure 1:
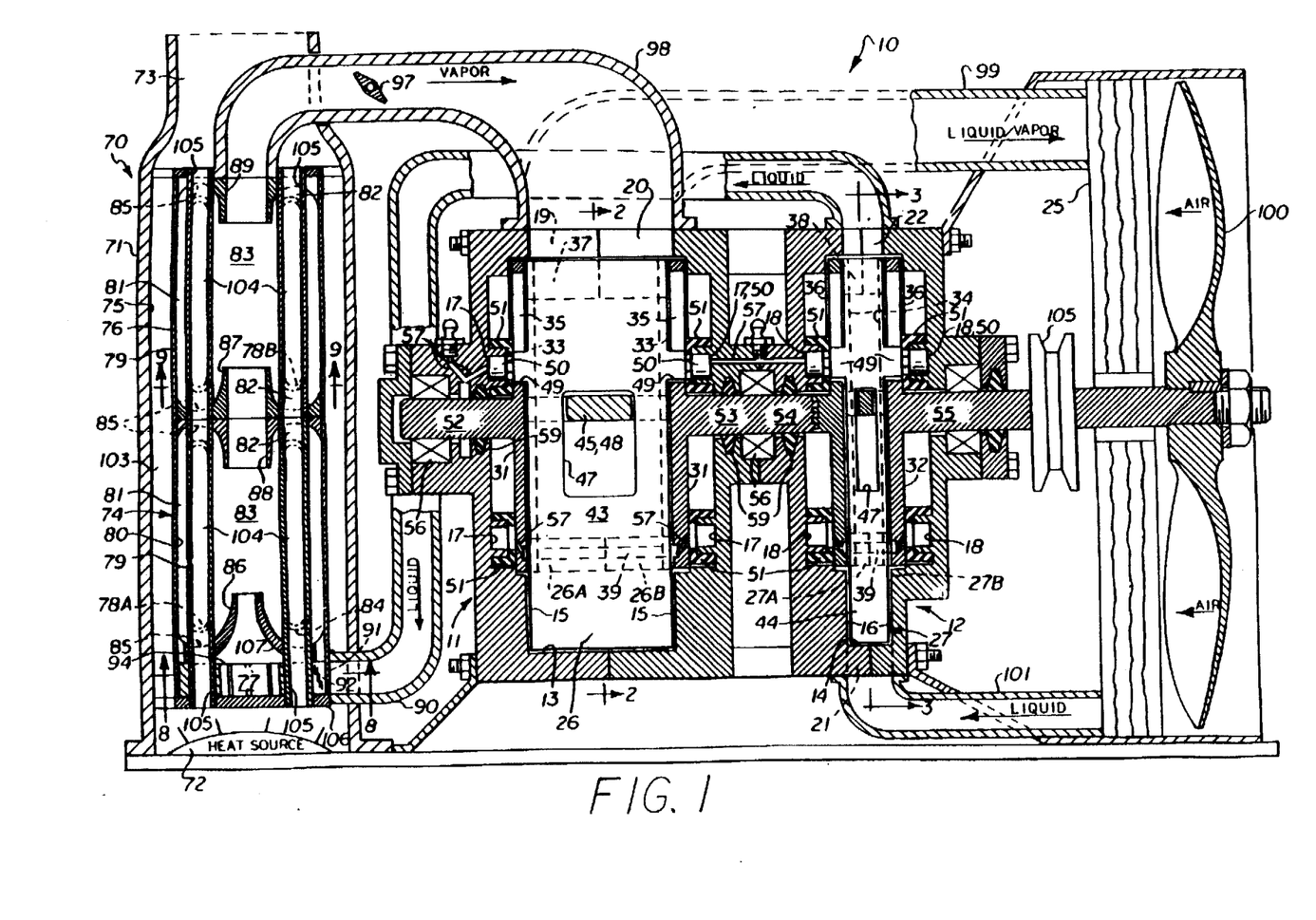
FIG. 1 is a longitudinal cross section through the sliding-blade vapor engine with vortex boiler in accordance with the present invention.

Referring to the drawings by numerals of reference, a preferred sliding-blade vapor engine 10 with vortex boiler in accordance with the present invention is shown in longitudinal cross section in FIG. 1. The engine 10 has an oval-shaped expander operating chamber 11 and an adjacent pump operating chamber 12. The expander operating chamber 11 is shown in vertical cross section in FIG. 2 and the pump operating chamber 12 is shown in vertical cross section in FIG. 3. The expander operating chamber 11 and the pump operating chamber are each defined by oval-shaped cavities having contoured oval-shaped side walls 13 and 14 and opposed facing flat end walls 15 and 16, respectively.

Continuous cylindrical-shaped guide grooves 17 and 18 are formed in the opposed interior surfaces of the flat end walls 15 and 16 of the expander operating chamber 11 and pump operating chamber 12, respectively. The interior and exterior peripheral surfaces of the guide grooves 17 and 18 are raised above the flat surface of the end walls. The center "A" of the cylindrical-shaped guide groves is concentric with the center of the oval-shaped expander and pump chambers 11 and 12.

Figure 2:
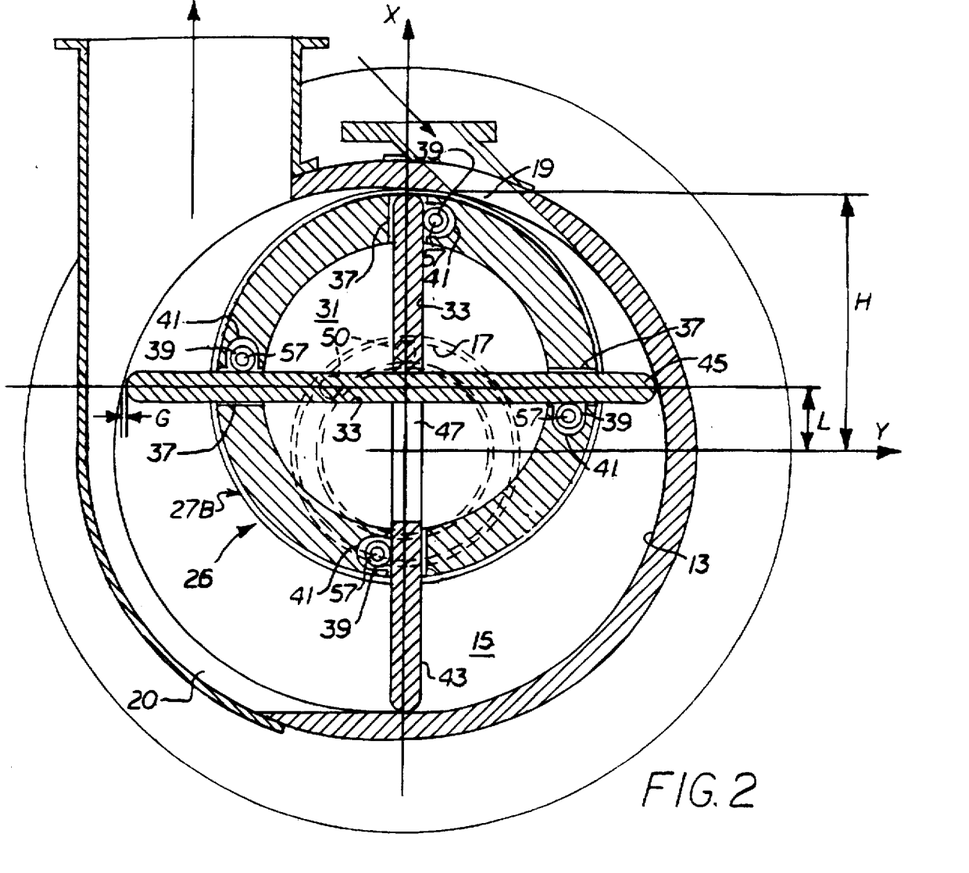
FIG. 2 is a vertical cross section through the expander chamber of the sliding-blade vapor engine taken along line 2—2 of FIG. 1.

As best seen in FIG. 2, the expander chamber 11 has an inlet port 19 through its side wall 13 positioned at an angle to allow entry of the working medium into the chamber tangential to the plane of rotation and a relatively large outlet port 20 which extends circumferentially along approximately one-half of its side wall and allows the working medium to exit tangential to the plane of rotation. The width of the inlet port 19 and outlet port 20 are approximately the same width as the expander chamber 11 to provide maximum filling of the volume of the chamber and minimize hydrodynamic loss.

Figure 3:
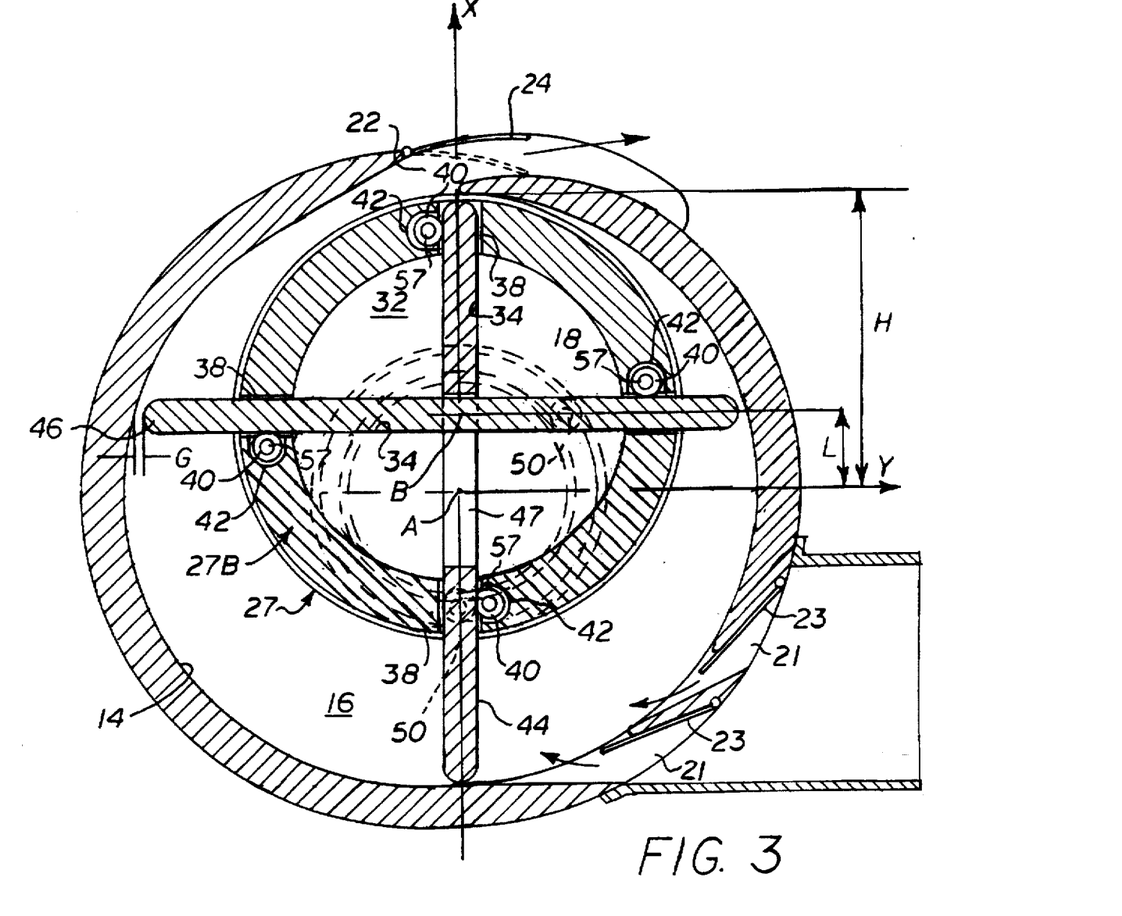
FIG. 3 is a vertical cross section through the pump chamber of the sliding-blade vapor engine taken along line 3—3 of FIG. 1.

As best seen in FIG. 3, the pump chamber 12 has a series of water intake ports 21 circumferentially spaced along approximately one-half of its side wall 14 each positioned at an angle to allow entry of water into the chamber tangential to the plane of rotation and an angular water exhaust port 22 through its side wall which allows the water to exit tangential to the plane of rotation. The width of the water intake ports 21 and exhaust port 22 are approximately the same width as the pump chamber 12 to provide maximum filling of the volume of the chamber and minimize hydrodynamic loss.

Each of the water intake ports 21 is provided with a one-way valve 23 which allows water to flow only into the pump chamber 12 and the exhaust port 22 is provided with a one-way valve 24 which allows water to flow only out of the pump chamber.

As shown in FIG. 1, the intake port 19 of the expander chamber 11 is connected to a nozzle 89 inside the boiler assembly 70 (described below) by a pipe 98 having a throttle 97 disposed therein. The exhaust port 20 of the expander chamber 11 is connected with a condenser 25 by a pipe 99. The condenser 25 is connected to the intake port 21 of the pump 12 by a pipe 101. A fan 100 directs air onto the condenser 25.

A sliding-blade expander rotor 26 and a sliding-blade pump rotor 27 are rotatably disposed in the respective expander operating chamber 11 and pump operating chamber 12.

Figure 4:
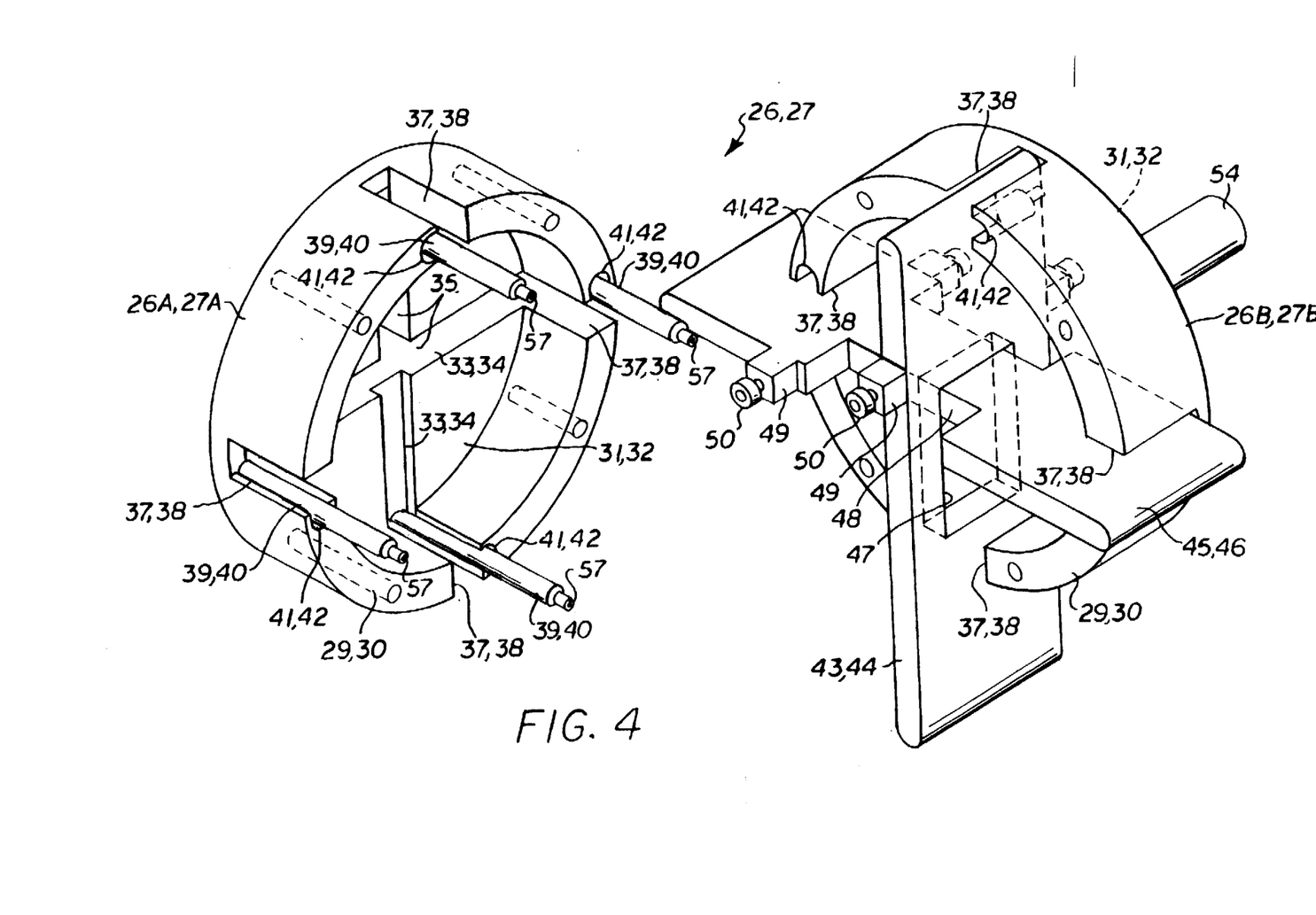
FIG. 4 is an exploded isometric view of the expander and pump rotor of the sliding-blade vapor engine shown in an unassembled condition.
Figure 5:
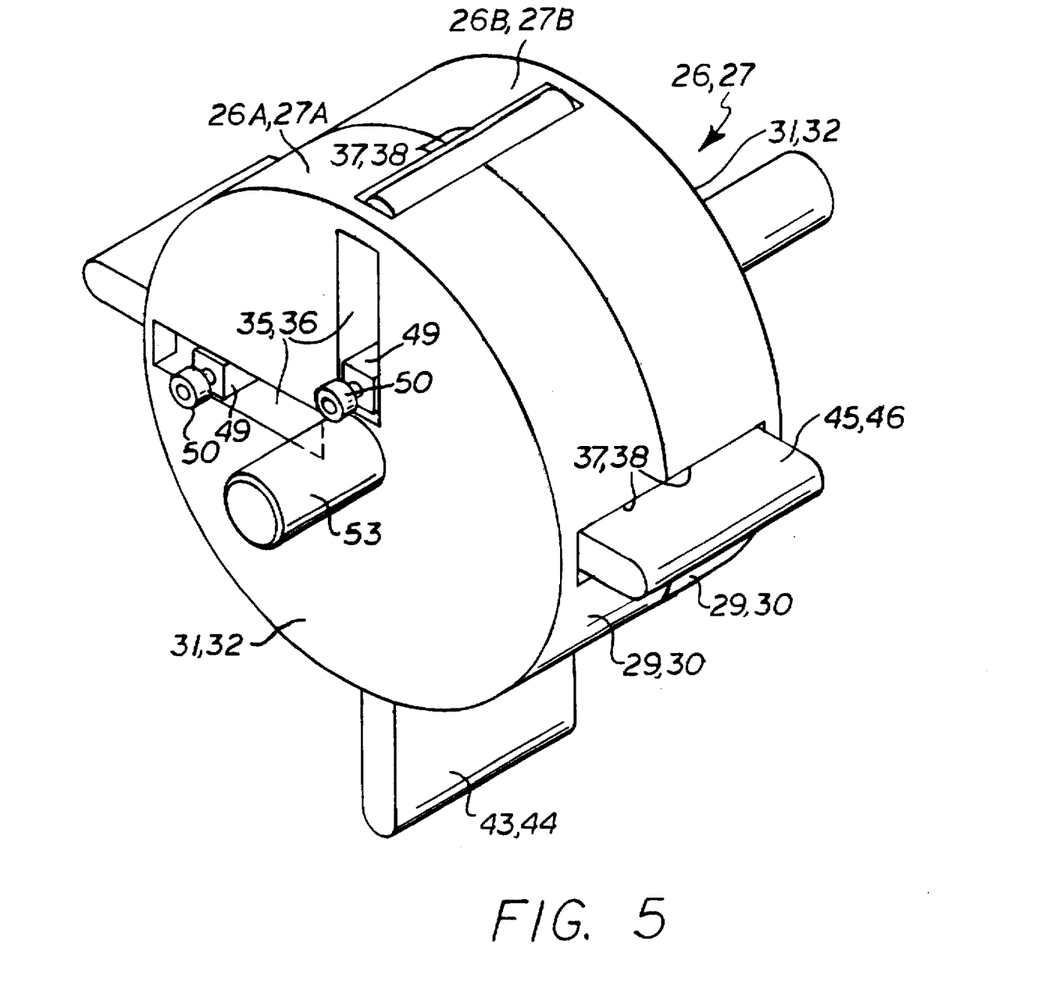
FIG. 5 is an isometric view of the expander and pump rotor of the sliding-blade vapor engine shown in an assembled condition.

As best seen in FIGS. 4 and 5, the expander rotor 26 and pump rotor 27 are each formed by a pair of opposed hollow cylindrical members 26A, 26B and 27A, 27B, respectively, each having a circular side wall 29 and 30 and an end wall 31 and 32. A pair of perpendicular elongate rectangular slots 33 and 34 are formed in the interior surface of the end walls 31 and 32 of the cylindrical members 26A, 26B and 27A, 27B and extend through the center of rotation of the cylindrical members. A portion of the slots 33 and 34 on one side of the center of rotation extend all the way through the flat end walls 31 and 32 of the cylindrical members 26A, 26B and 27A, 27B to form a pair of rectangular perpendicular slots 35 and 36 through the outer surface of the flat end walls 31 and 32, as best seen in FIG. 5.

A series of circumferentially spaced rectangular slots 37 and 38 extend through the circular side walls 29 and 30 of the circular members 26A, 26B and 27A, 27B from their open end and terminate at the flat end walls 31 and 32 in axial alignment with the slots 33 and 34 in the flat end walls.

As shown in FIGS. 2, 3, and 4, rollers 39 and 40 are mounted in recesses 41 and 42 in the side walls 29 and 30 of the cylindrical member 26A, 26B and 27A, 27B closely adjacent each slot 37 and 38 with their curved exterior surface protruding a short distance into the slot opening.

A pair of perpendicular elongate rectangular rigid blades 43, 44, and 45, 46 are slidably received in the elongate slots 33 and 34, respectively. One blade 43, 45 of each pair is provided with a central rectangular opening 47 and the other blade 44, 46 of each pair is provided with a central narrow rectangular portion 48 which is received through the opening 47 such that the perpendicular blades 43, 44, and 45, 46, can slide independently relative to one another. A foot lug 49 extends outwardly a short distance from the opposed side edges of each blade 43, 44, and 45, 46 in opposed relation, and a roller 50 is rotatably mounted at the outer end of each lug.

As shown in FIG. 5, the circular members 26A, 26B and 27A, 27B are secured together in opposed relation over the blades 43, 44 and 45, 46 to form a circular drum configuration. The outer ends of the blades 43, 44 and 45, 46 extend slidably through the slots 37 and 38 in the circular side walls 29 and 30 and are supported on opposed sides by the rollers 39, 40 as seen in FIGS. 2 and 3. In the assembled condition, the lugs 49 and rollers 50 extend through the slots 35 and 36 in the flat end walls 31 and 32 and the rollers 50 are received and travel in the continuous guide grooves 17 and 18 in the opposed interior surfaces of the flat end walls 15 and 16 of the expander operating chamber 11 and pump operating chamber 12, respectively, as seen in FIG. 1. A lubricant is supplied to the rollers 39, 40 and 50 through channels 57 and lubricators 58. An elastomeric seal collar 51 is installed on the raised interior and exterior peripheral surfaces of the guide grooves 17 and 18 and forms a fluid sealing relation against the exterior surfaces of the end walls 31 and 32 of the cylindrical members 26A, 26B and 27A, 27B.

As best seen in FIG. 1, a shaft 52 secured to the exterior of the flat end wall 31 of one the expander rotor cylindrical members 26A extends outwardly from its center through a hole in the flat end wall 15 of the expander chamber 11 and a coaxial opposed shaft 53 secured to the exterior of the opposed flat end wall 31 of the opposed cylindrical member 26B extends outwardly from its center through a hole in the opposed flat end wall 15 of the expander chamber 11. Similarly, a shaft 54 secured to the exterior of the flat end wall 32 of one of the pump rotor cylindrical members 27A extends outwardly from its center through a hole in the flat end wall 16 of the pump chamber 12 and a coaxial opposed shaft 55 secured to the exterior of the opposed flat end wall 32 of the opposed cylindrical member 27B extends outwardly from its center through a hole in the opposed flat end wall 16 of the pump chamber 12. The shafts 52, 53, 54, and 55 are journalled in the engine housing by bearings 56 and packing glands 59. The shafts 53 and 54 of the expander rotor 26 and pump rotor 27 are joined together by splines or other suitable means such that the rotors rotate together.

A fan blade 100 is mounted on the outer end of the shaft 55 to direct air across the condenser 25 and a pulley 105 is mounted on the shaft 55 for power take off.

The centerline "B" of the shafts 52–55 and rotors 26 and 27 is eccentrically offset from the center "A" of the oval-shaped expander and pump chambers 11 and 12. The offset distance or eccentricity is "L".

When the expander and pump rotors 26 and 27 turn, the blades 43, 44 and 45, 46 reciprocate radially resting on the rollers 39, 40 mounted in the walls 29, 30 of the cylindrical members 26A, 26B and 27A, 27B to form four vane blades of variable length in the respective operating chamber and function as pistons during the pumping and expansion of the working medium. The radial travel of the blades 40, 44 and 45, 46 is regulated by the guide grooves 17 and 18 in which the rollers 50 at the ends of the lugs 49 of each blade travel.

It should be understood, that although the expander rotor 26 and pump rotor 27 have been shown and described with a pair of blade members, the rotors may utilize any number of blades.

Figure 2A:
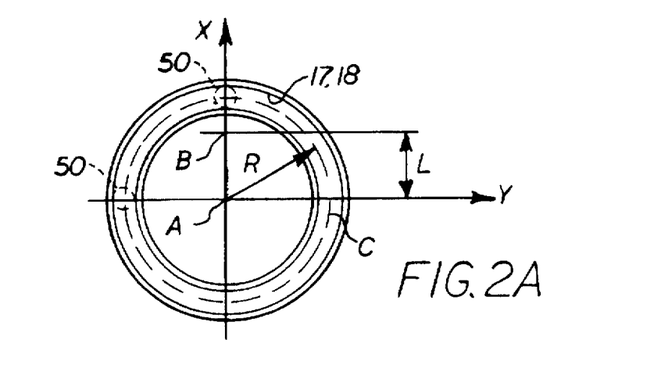
FIG. 2A is partial elevation view of the guide groove formed in the end walls of the expander and pump chambers of the sliding-blade vapor engine.

Referring now to FIGS. 2, 2A, and 3, the centerline "B" of the shafts 52–55 and rotors 26 and 27 is eccentrically offset from the center of the oval-shaped expander and pump chamber 11 and 12 and the guide grooves 17 and 18 by a distance L. The sliding-blades 43, 44 and 45, 46 of the expander rotor 26 and pump rotor 27 are of a predetermined length to provide a constant minimum clearance gap "G" between the outer tip ends of the blades and the interior surface of the oval side walls 13 and 14 of the expander chamber 11 and pump chamber 12, respectively.

In the preferred embodiment, the centerline "C" of the guide grooves 17 and 18 in the rotation plane of the expander and pump rotors 26 and 27 is the circuit with the radius "r". This radius "r" must be greater than the eccentricity "L". The centerline "C" of the cylindrical guide grooves is defined by the equation: $x^2+y^2=r^2$; where x and y=the vertical and horizontal coordinates, r=the circuit radius, and L=eccentricity of the center of rotor rotation relative to the central axis of the chamber and guide grooves.

The inner surface of the oval of the expander and pump chamber side walls 13 and 14 in the rotation plane of the rotor are calculated and configured according the equation:

$$\frac{x^2}{h^2} + \frac{y^2}{(h+1/4L)^2 - L^2} = 1$$

Where x and y=coordinates, h=half of vane length=half of large oval axis, and L=eccentricity.

Referring again to FIG. 1 and additionally to FIGS. 6, 7, 8 and 9, the vortex boiler 70 will be described.

The vortex boiler 70 has a hollow cylindrical outer housing 71 connected at its lower end with a heat carrier source or furnace 72 and the upper end of the housing 71 is open and is provided with a exhaust port 73. A hollow cylindrical heat transfer pipe 74 is secured within the outer housing 71 of the boiler 70. The interior diameter 75 of the outer housing 71 is larger than the exterior diameter 76 of the heat transfer pipe 74 to define an annular ring channel 103 between them which serves as an outer heating jacket. The annular ring channel 103 is joined at one end in communication with the heat carrier source 72 and in communication with the exhaust port 73 at the other end.

A first generally disk-shaped nozzle 86 is secured to the interior of the heat transfer pipe 74 a distance above its lower end and a second generally disk-shaped nozzle 89 is secured to the interior of the heat transfer pipe 74 at its upper end. Third and fourth generally disk-shaped nozzles 87 and 88 positioned back-to-back are secured to the interior of the heat transfer pipe 74 in longitudinal vertically spaced relation to the first and second nozzles 86 and 89. Each nozzle has a circular peripheral side wall, a central conical extension and a central bore with a concave curved surface 85 extending between the peripheral side wall and the base of the conical extension. The nozzles 86–89 are provided with a series of circumferentially spaced apertures through which a series of heat tubes 105 (described below) extend.

The conical extension and curved surface 85 of the first and second nozzles 86 and 89 at the lower and upper end, respectively, of the heat transfer pipe 74 are disposed in vertically opposed inward facing relation. The conical extension and curved surface 85 of the third and fourth nozzles 87 and 88 positioned back-to-back are disposed in vertically opposed outward facing relation toward the first and second nozzles 86 and 89. The first nozzle 86 near the lower end of the heat transfer tube has an inwardly contoured bottom surface 107 and a plurality of circumferentially spaced radially extending vanes 96 on its outer periphery.

Lower and upper elongate hollow toroids 78A and 78B each having elongate hooped interior cavities 104 are positioned in vertically spaced relation along the length of the interior of the heat transfer pipe 74 between the nozzles 86, 88 and 87, 89, respectively. The outer periphery 79 of the toroids 78A and 78B is smaller in diameter than the interior diameter 80 of the heat transfer pipe 74 to define an annular ring channel 81 therebetween. The rounded ends 84 of the toroids 78A and 78B are spaced a distance from the curved surfaces 85 of the nozzles to define curvilinear channels 82 which are in communication with the annular ring channel 81 and the central bores of the nozzles 86, 87, 88, and 89. The annular ring channel 81 and curvilinear channels 82 between the curved surfaces 84 and 85 define oblong looped recirculation channels.

The looped recirculation channels in cooperation with the nozzles 85, 86 form ejectors with a feedback loop. The radially extending vanes 96 of the nozzle 8614H form a peripheral vaned channel to direct fluid through the outer portion of the feedback loop. A schematic diagram of the ejector with feedback loop is illustrated in FIG. 6.

Figures 6, 7:
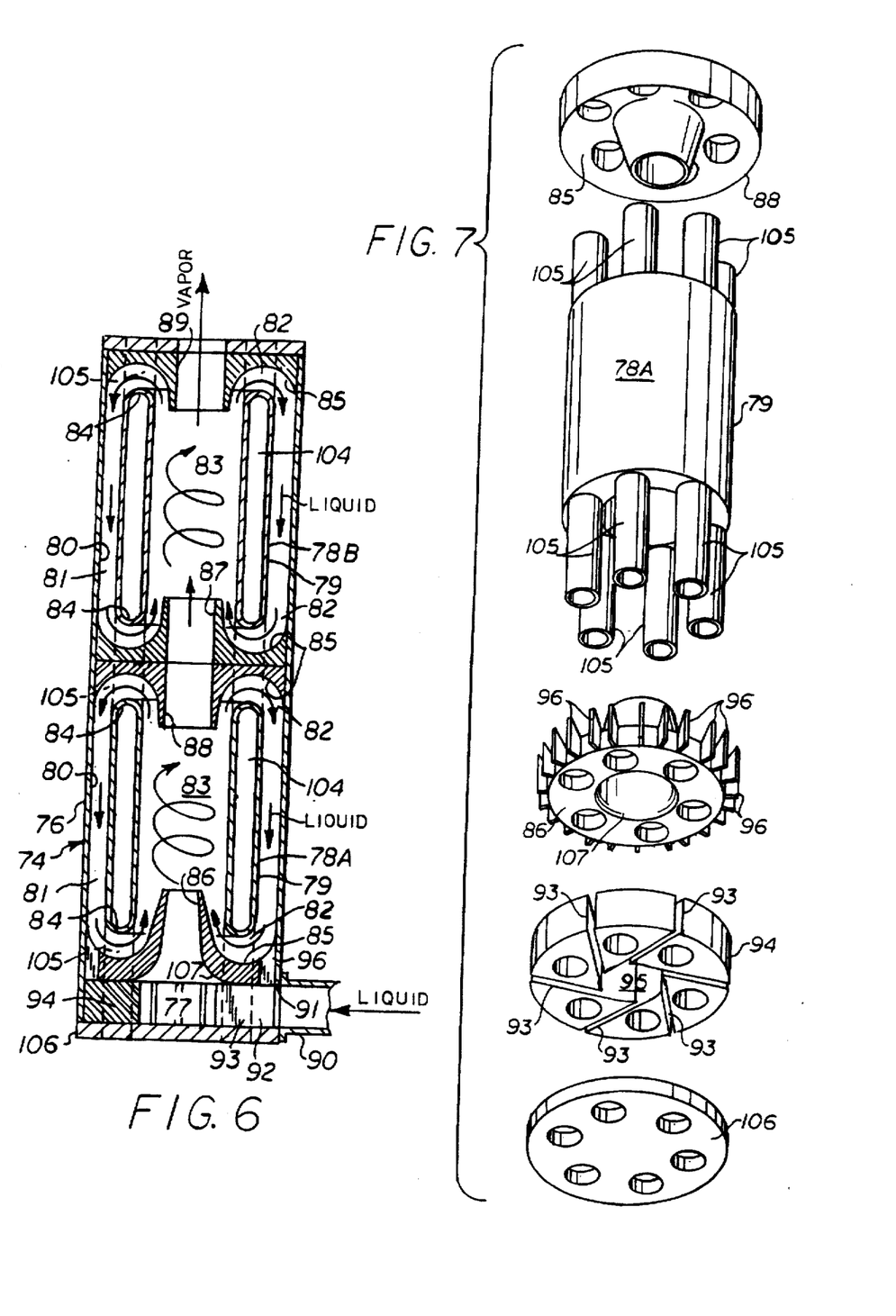
FIG. 6 is a vertical cross section through the heat transfer section of the vortex boiler showing the flow path of the ejector with feedback loop.
FIG. 7 is an exploded isometric view of the lower portion of the heat transfer section of the sliding-blade vapor engine shown in an unassembled condition.

The elongate hooped interior cavities 104 of the toroids 78 are connected in communication with a series of circumferentially spaced heat tubes 105 which extend the length of the heat transfer pipe 74 from the heat carrier source 72 to the exhaust port opening 73 (FIGS. 1 and 7). The interior cavities 104 of the toroids 78 and heat tubes 105 serve as an inner heating jacket. The bottom end of the heat transfer pipe 74 is enclosed by a flange 106 through which the bottom ends of the heat tubes 105 extend.

The interior of the heat transfer pipe 74 in cooperation with the nozzles 86, 87, 88, and 89 forms an upper chamber 83 and a lower vortex chamber 77. An inlet port 91 extends through the side wall of the heat transfer pipe 74 and is positioned to pass fluid tangentially into the vortex inlet chamber 77. The inlet port 91 of the vortex chamber is connected by piping 90 to the exhaust port 22 of the pump chamber 12.

Figure 8:
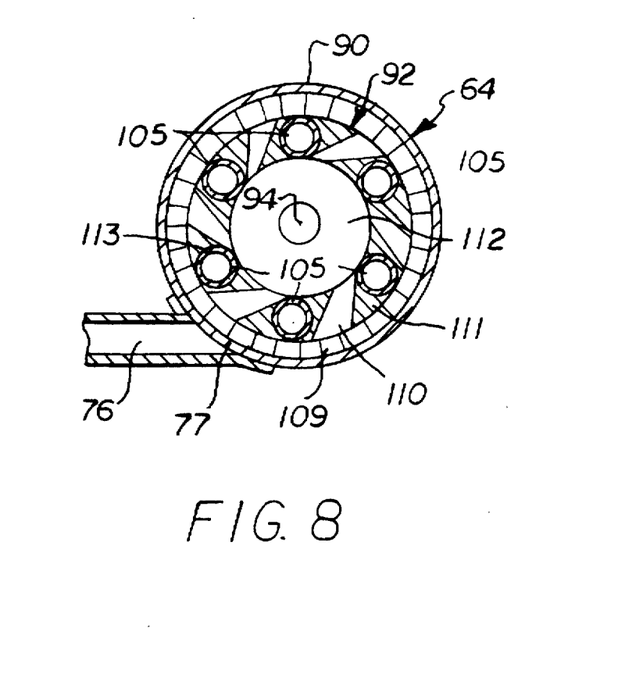
FIG. 8 is a horizontal cross section through the vortex boiler of the sliding-blade vapor engine taken along line 8—8 of FIG. 1.
Figure 9:
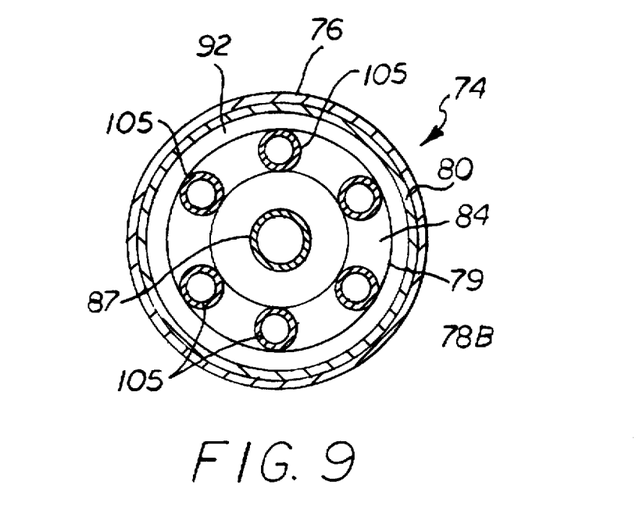
FIG. 9 is a horizontal cross section through the vortex boiler of the sliding-blade vapor engine taken along line 9—9 of FIG. 1.

As best seen in FIGS. 7 and 8, a generally disk-shaped radial guide vane assembly 94 is secured in the lower end of the heat transfer pipe 74 above the flange 106 and has a central bore 95 and circumferentially spaced apertures through which the lower portions of the heat tubes 105 extend. The radial guide vane assembly 94 has a series of channels 93 which extend tangentially outward from the central bore 95 to the periphery of the guide vane assembly. The space between the outer periphery of guide vane assembly 94 and the interior 80 of the heat transfer pipe 74 defines an annular ring distribution channel 92.

OPERATION

As best seen in FIGS. 1 and 6, to start the engine, heat from the heat source is drawn into the outer heating jacket (annular ring channel 103) and the inner heating jacket (interior cavities 104 of toroids 78 and heat tubes 105) of the vortex boiler 70. The first portions of vapor pass through pipe 98 and enter the inlet port 19 of the expander chamber 11 where it does useful work of expansion. Expansion causes rotation of the expander rotor 26, pump rotor 27, shafts 52, 53, 54, 55, the power take-off pulley 102, and the cooling fan 100. Exhaust vapor from the expander chamber 11 passes through pipe 99 and enters the condenser 25 in the form of a vapor-water mixture.

The vapor is condensed in the condenser 25 and is drawn into the pump chamber 12 through pipe 101 in form of liquid and becomes pressurized as the pump rotor 27 rotates. After passing through the pump 12 the liquid is discharged from the exhaust port 22 of the pump chamber 12 through piping 91 and enters the annular ring distribution channel 92 at the lower end of the vortex chamber 77, passes through the tangential channels 93 of the radial guide vane assembly 94 and enters its central bore 95, generating vortex flow of the liquid. The swirling vortex passes upwardly through the interior of the nozzle 86 and enters the upper chamber 83.

The swirling vortex flow passes upwardly in the chamber 83 and through the curvilinear channels 82 between the nozzle 88 and first toroid 78A (ejector with feedback), generating a longitudinal vortex recirculating flow path around the toroid 78A in channels 81, 82 and 83 and picks up heat from the outer heating jacket (annular ring channel 103) and inner heating jacket (cavities 104 of the toroid 78A and heat tubes 105). As a result of the Pito effect, "longitudinal" vortex circulation of the liquid is generated in the chamber 83 around toroid 78A through channels 82 and 81 such that feedback of the streams is achieved in forward and reverse directions. As a result, "transverse" vortex is added with the "longitudinal" vortex, and initiates intensive vortical structure of the streams. Due the significant centrifugal force developed in the process, separation and stratification of liquid takes place inside of this vortical stream.

Unvaporized liquid is brought into contact with the interior surface 80 of the heat transfer pipe 74 by centrifugal force and passes through annular ring channel 81 and the peripheral vanes 96 of nozzle 86 and returns into the annular ring distribution channel 92 at the lower end of the vortex chamber 77.

As best seen in FIG. 6, vaporized fluid from the chamber 83 and first toroid 78A passes upwardly through the central bores of the nozzles 88 and 87 and enters the upper portion of the chamber 83 in the form of a swirling vortex. The swirling vortex of vaporized fluid passes upwardly in the chamber 83 and through the curvilinear channels 82 between the nozzle 89 and second toroid 78B (ejector with feedback), generating a longitudinal vortex recirculating flow path around the second toroid 78B in channels 81, 82 and 83 and picks up heat from the outer heating jacket (annular ring channel 103) and inner heating jacket (cavities 104 of the toroid 78B and heat tubes 105). In the process, the vapor is superheated.

The superheated vapor under pressure passes through the central bore of the nozzle 89 through the pipe 98 having a throttle 97 mounted therein and enters the inlet port 19 of the expander 11 and is expanded to cause rotation of the shafts 52, 53, 54 and 55. Exhaust vapor in the form of vapor-water mixture is discharged through the exhaust port 20 of the expander 11, through pipe 99, and enters the condenser 25 onto which air is being blown by the fan 100. Liquid is drawn from the condenser 25 through pipe 101 and into the pump chamber 12 through the intake port 21. Available power may be transmitted by means of the pulley 102 as the shaft 55 rotates.

Because the heavier fraction of liquid in the boiler or cooler vapor in the vapor-superheater is forced against and directly contacts with heat transmitting surface of the inner and outer heating jackets, a high level of heat transfer takes place and augments the Nusselt number many-fold (up to 700%). The process of generating vortices in sequential ejectors with feedback loops along the length of the heat transfer section leads to considerable decrease in the overall dimensions of the heat exchanger for a given heat output. This allows the engine to be used in different areas of thermal power plants including nuclear power plants. In the latter case, the present heat exchanger design allows a reduced size of the reactor active zone and, accordingly, reduced nuclear fuel loading.

Figure 10:
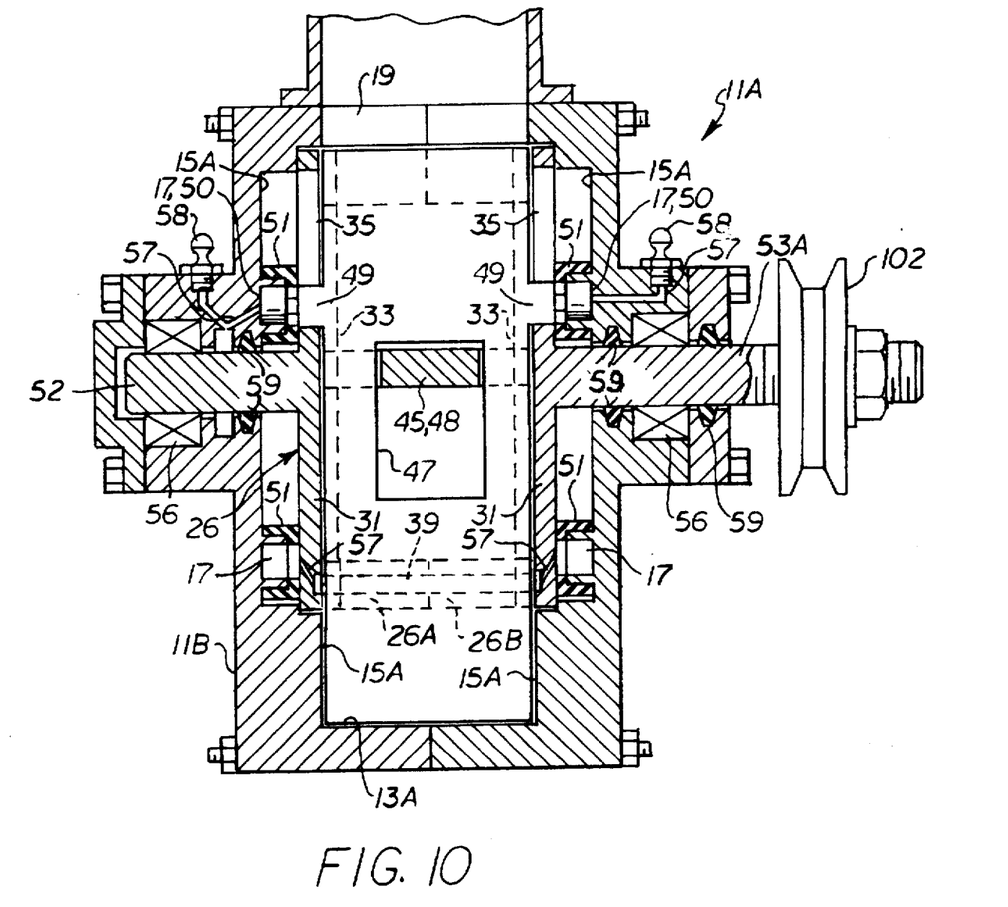
FIG. 10 is a vertical cross section through the expander for geothermal brine.

Referring now to FIG. 10 of the drawings, there is shown a modification of the expander 11A, which operates on gas or gas-vapor-water mixture as the working medium, for example on geothermal fluids of all qualities. In this modification, the pump and boiler are not used.

In the following description, only the components which are modified are described in detail. The rotor and other components of the expander which are not modified are the same as previously described are given the same reference numerals. However, the detailed description of the unmodified components will not be repeated to avoid repetition. The embodiment 11A has an oval-shaped chamber 11B defined by an oval-shaped cavity having a contoured oval-shaped side wall 13A and opposed facing flat end walls 15A. As previously described, continuous guide grooves 17 are formed in the opposed interior surfaces of the flat end walls 15A of the chamber 11B. The interior and exterior peripheral surfaces of the guide grooves 17 are raised above the flat surface and are provided with the seal collar 51.

A lubricant is supplied to the rollers 39 and 50 through channels 57 and a lubricator 58 as described above. The expander chamber 11B of expander 11A has an inlet and outlet port positioned to allow the working medium to exit tangential to the plane of rotation. As previously described, the width of the inlet port 19 and outlet port 20 are approximately the same width as the expander chamber 11B to provide maximum filling of the volume of the chamber and minimize hydrodynamics loss.

A sliding-blade rotor 26, as previously described and shown in detail in FIGS. 4 and 5 is rotatably disposed in the chamber 11B. In the expander modification, one of the shafts 53A secured to the exterior of the flat end wall 31 of one of the rotor cylindrical members 26B extends outwardly from its center through hole in the flat end wall 15A of the chamber 11B and a drive pulley 102 is secured to its outer end. The pulley 102 serves as a power take-off means.

As previously described, when the rotor 26 turns, the blades 43 and 45 reciprocate radially resting on the rollers 39 mounted in the side walls 29 of the cylindrical members 26A and 26B to form four vane blades of variable length in the chamber function as piston during the expansion of the working medium. It should be understood that the rotor may utilize any number of blades.

While this invention has been described fully and completely with special emphasis upon preferred embodiments, it should be understood that within the scope of the appended claims the invention may be practiced otherwise than as specifically described herein.

We claim:

1. A sliding-blade fluid expansion engine comprising:
   a housing having an oval-shaped expander chamber with a peripheral side wall which is oval-shaped in cross section, parallel opposed facing flat end walls, and a cylindrical guide groove concentric with said peripheral side wall formed in each said end wall;
   a cylindrical expander rotor having a circular side wall, parallel opposed flat end walls, a concentric shaft extending outwardly from each said expander rotor end wall, and at least two mutually perpendicular slots extending radially through said expander rotor with a radial extending portion of each said slot extending through said expander rotor end walls, said expander rotor rotatably mounted by said shafts eccentrically in said expander chamber relative to the major axis of said expander chamber;
   at least two elongate rectangular expander blades, one slidably mounted in each of said slots extending slidably through said expander rotor in mutually perpendicular relation and each independently movable relative to the other in a radial direction, each said expander blade having a guide element extending from opposed sides and through said radial extending portion of each said slot outwardly from said expander rotor end walls and slidably received in a said cylindrical guide groove in said expander chamber end walls;
   said inner periphery of said oval-shaped side walls of said expander chamber in the plane of rotor rotation configured according to the equation:

$$\frac{x^2}{h^2} + \frac{y^2}{(h+1/4L)^2 - L^2} = 1$$

where x and y represent vertical and horizontal coordinates of said expander chamber, h is equal to one-half of the length of said rotor blades and equal to one-half of the major axis of said oval-shaped inner periphery, and L is equal to the eccentrically offset distance between the center of said oval-shaped expander chamber and said guide grooves;

upon rotation of said expander rotor said guide elements traveling in said cylindrical guide grooves causing said expander blades to extend and retract radially with their outer ends following the inner periphery of said oval-shaped side walls of said expander chamber with a constant clearance between the outer tip ends of said blades and said inner periphery of said expander chamber side walls; and working fluid inlet and outlet means formed in said expander chamber side wall configured to receive a working fluid tangential to the direction of rotation of said expander rotor, said working fluid expanding upon entry into said expander chamber to impart a force on said expander blades to cause rotation of said expander rotor and to discharge the working fluid tangential to the direction of rotation of said expander rotor.

2. The engine according to claim 1 including power take-off means connected with at least one of said shafts to drive power generating means.

3. The engine according to claim 1 wherein said cylindrical guide grooves in said expander chamber end walls have a centerline in the plane of rotation defined by the equation:

$$x^2+y^2=r^2$$

where x and y represent the vertical and horizontal coordinates, r represents the circuit radius and is greater than the eccentrically offset distance between the center of rotor rotation relative to the central axis of said expander chamber and said guide grooves.

4. The engine according to claim 1 wherein said working fluid inlet and outlet means formed in said expander chamber side wall is substantially the same width as the width of said expander chamber.

5. The engine according to claim 1 further comprising:

a fluid pump chamber in said housing adjacent said expander chamber having a peripheral side wall which is oval-shaped in cross section, parallel opposed facing flat end walls, and a cylindrical guide groove concentric with said peripheral side wall formed in each said end wall;

a cylindrical pump rotor having a circular side wall, parallel opposed flat end walls, a concentric shaft extending outwardly from each said pump rotor end wall, and at least two mutually perpendicular slots extending radially through said pump rotor with a radial extending portion of each said slot extending through said pump rotor end walls, said pump rotor rotatably mounted by said shafts eccentrically in said pump chamber relative to the major axis of said pump chamber;

at least two elongate rectangular pump blades, one slidably mounted in each of said slots extending slidably through said pump rotor in mutually perpendicular relation and each independently movable relative to the other in a radial direction, each said pump blade having a guide element extending from opposed sides and through said radial extending portion of each said slot outwardly from said pump rotor end walls and slidably received in a said cylindrical guide groove in said pump chamber end walls;

one of said shafts of said expander rotor and one of said shafts of said pump rotor connected together coaxially whereby rotation of said expander rotor causes simultaneous rotation of said pump rotor, and upon rotation of said expander and pump rotors said guide elements traveling in said cylindrical guide grooves causing said expander blades and said pump blades to extend and retract radially with their outer ends following the inner periphery of the respective oval-shaped side walls of said expander chamber and said pump chamber with a constant clearance between the outer tip ends of said blades and said inner periphery of said inner peripheries;

liquid inlet and outlet means formed in said pump chamber side wall configured to draw a liquid into said pump chamber tangential to the direction of rotation of said pump rotor upon rotation thereof, and as rotation continues said pump blades pressurizing the liquid in said pump chamber, and discharging the pressurized liquid through said liquid outlet means.

6. The engine according to claim 5 wherein said inner periphery of said oval-shaped side walls of said pump chamber in the plane of rotor rotation is configured according to the equation:

$$\frac{x^2}{h^2} + \frac{y^2}{(h+1/4L)^2-L^2} = 1$$

where x and y represent vertical and horizontal coordinates of said pump chamber, h is equal to one-half of the length of said pump blades and equal to one-half of the major axis of the oval-shaped inner periphery, and L is equal to the eccentrically offset distance between the center of said oval-shaped pump chamber and said guide grooves.

7. The engine according to claim 5 wherein said cylindrical guide grooves in said pump chamber end walls have a centerline in the plane of rotation defined by the equation:

$$x^2+y^2=r^2$$

where x and y represent the vertical and horizontal coordinates, r represents the circuit radius and is greater than the eccentrically offset distance between the center of rotor rotation relative to the central axis of said pump chamber and said guide grooves.

8. The engine according to claim 5 further comprising roller means on said pump rotor disposed adjacent said radially extending slots and engaged with said pump blades to support and facilitate extension and retraction thereof.

9. The engine according to claim 5 further comprising guide roller means at the outer ends of said pump blade guide elements rotatably engaged in said cylindrical guide grooves in said pump chamber end walls.

10. The engine according to claim 9 further comprising lubrication means connected with said guide grooves in said pump chamber side walls to provide lubrication to said guide roller means, and lubricant seal means surrounding each said guide groove disposed between the inner surface of each said pump chamber end wall and the outer surface of said pump rotor end wall to form a lubricant sealing relation therebetween.

11. The engine according to claim 5 wherein said liquid inlet and outlet means formed in said pump chamber side wall is substantially the same width as the width of said pump chamber.

12. The engine according to claim 5 further comprising valve means connected with said pump chamber liquid inlet means to allow liquid to flow only into said pump chamber, and valve means connected with said pump chamber outlet means to allow liquid to flow only out of said pump chamber.

13. The engine according to claim 5 further comprising:

a vortex boiler having an inlet for receiving a fluid to be heated, vortex means adjacent said boiler inlet for causing said received fluid to form a swirling vortex, and a fluid outlet connected with said working fluid inlet means of said expander chamber for discharging the swirling vortex of heated fluid to be used as said working fluid;

elongate curvilinear looped fluid recirculation channels in said boiler configured to generate longitudinal and transverse vortex flow of a portion of said received fluid and to recirculate said portion back into said swirling vortex;

said vortex boiler connected with a source of heat of sufficient temperature to vaporize said fluid and discharge it as a vaporized working fluid to be expanded in said expander chamber.

14. The engine according to claim 13 further comprising:

condenser means for condensing said working fluid having a fluid inlet connected with said expander chamber working fluid outlet and a liquid outlet connected with said pump chamber liquid inlet;

said pump chamber liquid outlet connected with said vortex boiler fluid inlet;

said condenser receiving said working fluid from said expander chamber, condensing it into a liquid, said condensed liquid being drawn into said pump chamber by said pump rotor, pressurized, and discharged into said vortex boiler, formed into a swirling vortex and vaporized in said vortex boiler, and the swirling vortex of vaporized working fluid discharged from said vortex boiler into said expander chamber and expanding in said expander chamber to cause rotation of said expander rotor.

15. The engine according to claim 13 wherein said vortex boiler comprises a hollow generally cylindrical outer member having one end in communication with said source of heat and having an exhaust opening at another end;

a hollow cylindrical heat transfer pipe secured concentrically within said outer member, the outer diameter of said heat transfer pipe being smaller than the inner diameter of said outer member to define an elongate generally cylindrical annulus therebetween, the interior of said heat transfer pipe defining a central vortex chamber, one end of said central vortex chamber connected with said working fluid inlet means of said expander chamber and defining said vortex boiler fluid outlet; and said vortex boiler fluid inlet and vortex means being in fluid communication with said annulus, said annulus having an inlet end in communication with said source of heat and having an exhaust opening at another end, and said annulus serving as an outer heating jacket.

16. The engine according to claim 15 further comprising elongate heat exchanger means secured within said heat transfer pipe having a plurality of first heat channels extending the length of said heat transfer pipe with inlet ends in communication with said source of heat and their opposed ends in communication with said outer member exhaust opening for passing hot air therethrough; and a plurality of longitudinally spaced elongate curvilinear looped fluid recirculation channels having an inner longitudinal portion in communication with said central vortex chamber and an outer longitudinal portion in communication with said annulus for conducting a portion of said swirling vortex of fluid in a longitudinal and transverse recirculating flow path around said first heat channels in heat exchange relation and feeding it back into said central vortex chamber;

separation and stratification of said swirling vortex of fluid into a liquid faction and a vapor faction and unvaporized liquid being brought into contact with the interior surface of said heat transfer pipe by centrifugal force and a portion thereof returned through said annulus and said vortex means into said central vortex chamber, and the vapor faction passing through said vortex boiler fluid outlet into said expander chamber.

17. The engine according to claim 16 wherein said elongate heat exchanger means comprises a series of generally disk-shaped nozzle members secured to the interior of said heat transfer pipe in longitudinally spaced relation, each having a central bore surrounded by a central conical extension with a concave curved surface surrounding said conical extension, said conical extensions and concave curved surfaces of adjacent ones of said nozzle members facing in opposed relation;

a series of circumferentially spaced tubular members extending the length of said heat transfer pipe through said nozzle members radially spaced from said conical extensions and having inlet ends in communication with said source of heat and their opposed ends in communication with said outer member exhaust opening; and a plurality of elongate generally cylindrical toroids secured to said tubular members in longitudinally spaced relation between adjacent ones of said nozzled members, said toroids having a central cavity in communications with the interiors of said tubular members and opposed convex rounded ends spaced a distance from said nozzle member concave curved surfaces to form curved passageways between said central vortex chamber and said annulus; and the interior of said toroids and tubular members defining said first heat channels for passing hot air therethrough, and said curvilinear looped fluid recirculation channels defined by the exterior surfaces of said toroids and said curved passageways.

* * * * *